US 6,795,742 B1

(12) United States Patent
Ichikawa (10) Patent No.: US 6,795,742 B1
(45) Date of Patent: Sep. 21, 2004

(54) PRODUCTION MANAGEMENT METHOD IN A PLURALITY OF PRODUCTION LINES

(75) Inventor: Yoshimasa Ichikawa, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 0 days.

(21) Appl. No.: 10/665,461

(22) Filed: Sep. 22, 2003

(30) Foreign Application Priority Data

Apr. 3, 2003 (JP) ........................... 2003-100585

(51) Int. Cl.⁷ ............... G06F 17/60; G06F 19/00
(52) U.S. Cl. ............... 700/97; 700/100; 718/100; 705/8
(58) Field of Search ................. 700/90, 95, 97, 700/100; 718/100, 102–104; 705/8, 9; 716/8

(56) References Cited

U.S. PATENT DOCUMENTS

| | | | | |
|---|---|---|---|---|
| 5,233,534 A | * | 8/1993 | Osthus et al. | 700/100 |
| 6,400,999 B1 | * | 6/2002 | Kashiyama et al. | 700/100 |
| 6,546,300 B1 | * | 4/2003 | Fukuda et al. | 700/100 |
| 6,615,097 B2 | * | 9/2003 | Ozaki | 700/121 |
| 2003/0195794 A1 | * | 10/2003 | Yasuda | 705/10 |

FOREIGN PATENT DOCUMENTS

| | | |
|---|---|---|
| JP | 9-128440 | 5/1997 |
| JP | P2000-158300 A | 6/2000 |

* cited by examiner

Primary Examiner—Jayprakash N. Gandhi
(74) Attorney, Agent, or Firm—McDermott Will & Emery LLP (57) ABSTRACT

A production management method includes the steps of: managing parallel production in a plurality of production lines to acquire an order model name and a production type name; acquiring a production record; acquiring order information; allocating products in process in the plurality of production lines in chronological order of delivery time based on the order information; reading production condition data or the like when allocation shortage arises; calculating a conversion-estimated number of good products based on a product yield; calculating a scheduled good product completion date for each new input lot in consideration of a customer authentication acquiring date and a temporary cease period; and allocating the new input lot to shortage of volume in process.

16 Claims, 7 Drawing Sheets

| ORDER NUMBER | CUSTOMER CODE | ORDERED MODEL NAME | ORDER VOLUME | DELIVERY TIME |
|---|---|---|---|---|
| SR001 | CU_A | M34100 | 3,000 | 2002/10/12 |
| SR002 | CU_B | M34200 | 2,000 | 2002/10/13 |
| SR003 | CU_C | M34100 | 3,000 | 2002/10/13 |
| SR004 | CU_A | M34100 | 4,700 | 2002/10/14 |
| SR005 | CU_D | M34100 | 4,000 | 2002/10/18 |
| SR006 | CU_B | M34200 | 1,000 | 2002/10/20 |
| : | | | | |

FIG. 3

| PRODUCTION TYPE NAME | PRODUCTION LINE | PRODUCTION CAPACITY (PIECES/DAY) | PRODUCT YIELD (%) | PRODUCTION LEAD TIME (DAYS) |
|---|---|---|---|---|
| M34100_D1 | LINE_1 | 2,000 | 90 | 5 |
| M34100_D2 | LINE_2 | 3,000 | 90 | 5 |
| M34200_D1 | LINE_1 | 2,000 | 95 | 6 |
| M34200_D3 | LINE_3 | 1,000 | 95 | 6 |
| : | | | | |

FIG. 4

| PRODUCTION LINE | CEASE START | CEASE END |
|---|---|---|
| LINE_1 | 2002/10/14 | 2002/10/17 |
| : | | |

FIG. 5

| CUSTOMER CODE | PRODUCTION TYPE NAME | SCHEDULED AUTHENTICATION ACQUIRING COMPLETION DATA | AUTHENTICATED LINE |
|---|---|---|---|
| CU_D | M34100_D2 | 2002/10/12 | LINE_2 |
|  |  |  |  |

FIG. 6

| ORDERED MODEL NAME | USAGE PRIORITY | PRODUCTION TYPE NAME |
|---|---|---|
| M34100 | 01 | M34100_D1 |
| M34100 | 02 | M34100_D2 |
| M34200 | 01 | M34100_D1 |
| M34200 | 02 | M34100_D3 |
| : |  |  |

F I G. 7

| PRODUCTION TYPE NAME | PRODUCTION NUMBER | STEP IN PROCESS | REMAINING DAYS (DAYS) | VOLUME IN PROCESS (PIECES) | PRODUCT YIELD (%) | CONVERSION-ESTIMATED NUMBER OF GOOD PRODUCTS (PIECES) | SCHEDULED COMPLETION DATE |
|---|---|---|---|---|---|---|---|
| M34100_D1 | LOT_01 | A30 | 3 | 1,800 | 90 | 1,620 | 2002/10/12 |
| M34100_D1 | LOT_02 | A20 | 4 | 2,000 | 90 | 1,800 | 2002/10/13 |
| M34100_D1 | LOT_03 | A40 | 2 | 2,715 | 95 | 2,580 | 2002/10/11 |
| .. | | | | | | | |

PRODUCTION MANAGEMENT METHOD IN A PLURALITY OF PRODUCTION LINES

BACKGROUND OF THE INVENTION

1. Field of the Invention

The present invention relates to management of production lines producing various products and, more particularly, to a production management method in production of products with loads distributed over a plurality of production lines.

2. Description of the Background Art

Various methods for making production plans have been conventionally developed, as a production management system, for the purposes of controlling a relation between a production capacity and a load with certainty, to level a load, and to observe delivery times. Especially, as for making a production plan for a production process having many steps, as in an assembling, in which a multiple kinds of basic parts are sequentially assembled into intermediate parts to eventually fabricate a finished product, the following are exemplified.

Japanese Patent Laying-Open No. 2000-158300 discloses a method for making a production plan capable of easily making an excellent plan giving simultaneous consideration to a relation between a capacity and a load, possibility in procurement of materials, leveling of a load, observance of delivery times and others. This method for making a production plan includes the steps of: performing development using a MRP system under production number control with delivery time information, production information, inventory information and calendar information to prepare a string-attached MRP development information; evaluating constraints of the prepared string-attached MRP development information based on material delivery schedule information and capacity information to extract information associated with a constraint-violated order from the string-attached MRP development information based on a result of the evaluation; and correcting the string-attached MRP development information associated with the extracted violated order based on the material delivery schedule information and the capacity information to thereby adjust a production plan.

According to this method for making a production plan, since mutual reference is enabled between a series of string-attached demands and orders, an influence of the adjustment on the other product items can be instantly judge with result that adjustment is enabled of a plan in which consideration is given to an influence to all of the product items and all of the process; thereby enabling a plan adjusting time to be reduced and furthermore, improvement on a quality of the plan. Furthermore, an increase in load beyond the capacity is enabled, and adjustment is enabled for a plan in which the load exceeds the capacity without performing a re-trial through a modification on capacity information and for a plan in which the load is lower than the capacity but leveled, thereby, enabling a plan adjusting time to be reduced and improvement on a quality of the plan.

Furthermore, Japanese Patent Laying-Open No. 9-128440 discloses a production planning system in which a production plan is analyzed to thereby narrow down adjustment contents for extracting a problematic point or improving a plan and to further enable decision making support. for a person in charge of production planning in plan adjustment. This production planning system handles production processes for items constituting a finished product each as at least one shop relative to a completion schedule showing a completion date and a numerical volume and others of the finished product requested by a user to calculate a period capable of producing the item in each shop and to thereby determine a production schedule till the finished product is completed, includes: means for controlling operating capacities of the shops and spare capacities of the shops derived from the operating capacities and operating loads imposed on the shops; means for determining dates on which operating loads necessary for the finished product are secured from the spare capacities of the shops in case where no production schedule is enabled that meets a completion date defined by the completion schedule; and means for calculating a production enabling date for the finished product based on the dates determined on the respective shops.

According to the production planning system, since a planner has conventionally determined satisfactory adjustment contents from adjustment contents having a high degree of freedom using a great volume of data as an object, much of time is spent in studying because of various kinds of try and error in adjustment, whereas according to a production planning system of the present invention, items, which are objects for planning, or planning statuses of shops are analyzed concerning a plan including a problem; thereby enabling a proposal, in a short time, on a adjusted draft for making a plan capable of implementing and in turn enabling reduction in time spent for making a production plan meeting an evaluation measure of the planner. That is, a spare capacity of each shop is analyzed, thereby enabling a proposal on a adjusted draft in a case where a change in a completion schedule occurs or the like case.

In making a production plan in a semiconductor fabrication process or the like, when a demand (an order volume from a customer, who is a purchaser of a product) is larger than a production capacity, a production is executed by organizing a parallel production model in which a plurality of production lines are included in consideration of load allocation over the production lines. In a drafting of a production plan, a just-in-time scheme (in which necessary volumes of necessary items are produced when being necessary) is usually adopted because of compression of inventory assets. For this reason, a production plan is made so as to realize the shortest lead time and to minimize stock in process and stock as a finish product. As a result, load distribution over capacities of a plurality of production lines is inevitably in a parallel fashion.

Once scheduling is performed with a model for a parallel production plan, load distribution is forced to be in a parallel fashion. In a case where a production line is temporarily ceased for some reason or other, however, load is unbalanced to be distributed on other limited operable production lines. In addition thereto, there also exists a factor that when a new production line is put into operation, a product from the new line can be delivered to the customer for the first time after an approval of the customer for the new production line. A problem arises that production conditions are complicated in a case where a plurality of lines are operated to implement parallel production in this way.

Facing such a problem, however, no solution therefor can be given with applications of the method for making a production plan disclosed in Japanese Patent Laying-Open No. 2000-158300 described above and the production planning system disclosed in Japanese Patent Laying-Open No. 9-128440; therefore, manual processing has been adopted to cope with the problem. That is, a cease of production and supply such as a temporary cease of a production line can be controlled using a holiday calendar set in each production line, whereas a perfect production management is disabled that includes a condition of whether or not adaptability for a specific customer in delivery, quality or the like can be achieved in each production line.

SUMMARY OF THE INVENTION

It is an object of the present invention to provide a production management method in a plurality of production lines.

It is another object of the present invention to provide a production management method in a plurality of production lines in consideration of various constraint conditions associated with the production lines.

It is still another object of the present invention to provide a production management method in a plurality of production lines in consideration of restraint conditions, designated by a purchaser, and associated with the production lines.

It is yet another object of the present invention to provide a production management method in a plurality of production lines in consideration of constraint conditions for maintenance associated with the production lines.

A production management method according to the present invention is a production management method for performing parallel production in a plurality of production lines including the steps of: storing order information concerning an order volume and a delivery time thereof from a purchaser; storing cease period information concerning a cease period of a production line; storing authentication information concerning authentication of a production line from the purchaser; detecting a volume in process in the plurality of production lines; calculating an additional input volume on the basis of the volume in process and the order volume; calculating a scheduled production completion date in consideration of the cease period for an input lot for which the authentication information is obtained; and allocating the input lot to the order information on the basis of the scheduled production completion date and the delivery time.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Description will be given of embodiments of the present invention below with reference to the accompanying drawings. In the following description, the same constituents are attached by the same symbols. The names of the constituents and functions there of are the same as each other. Therefore, none of detailed descriptions thereof will be repeated.

First Embodiment

Description will be given of a production management system according to a first embodiment of the present invention.

Figure 1:
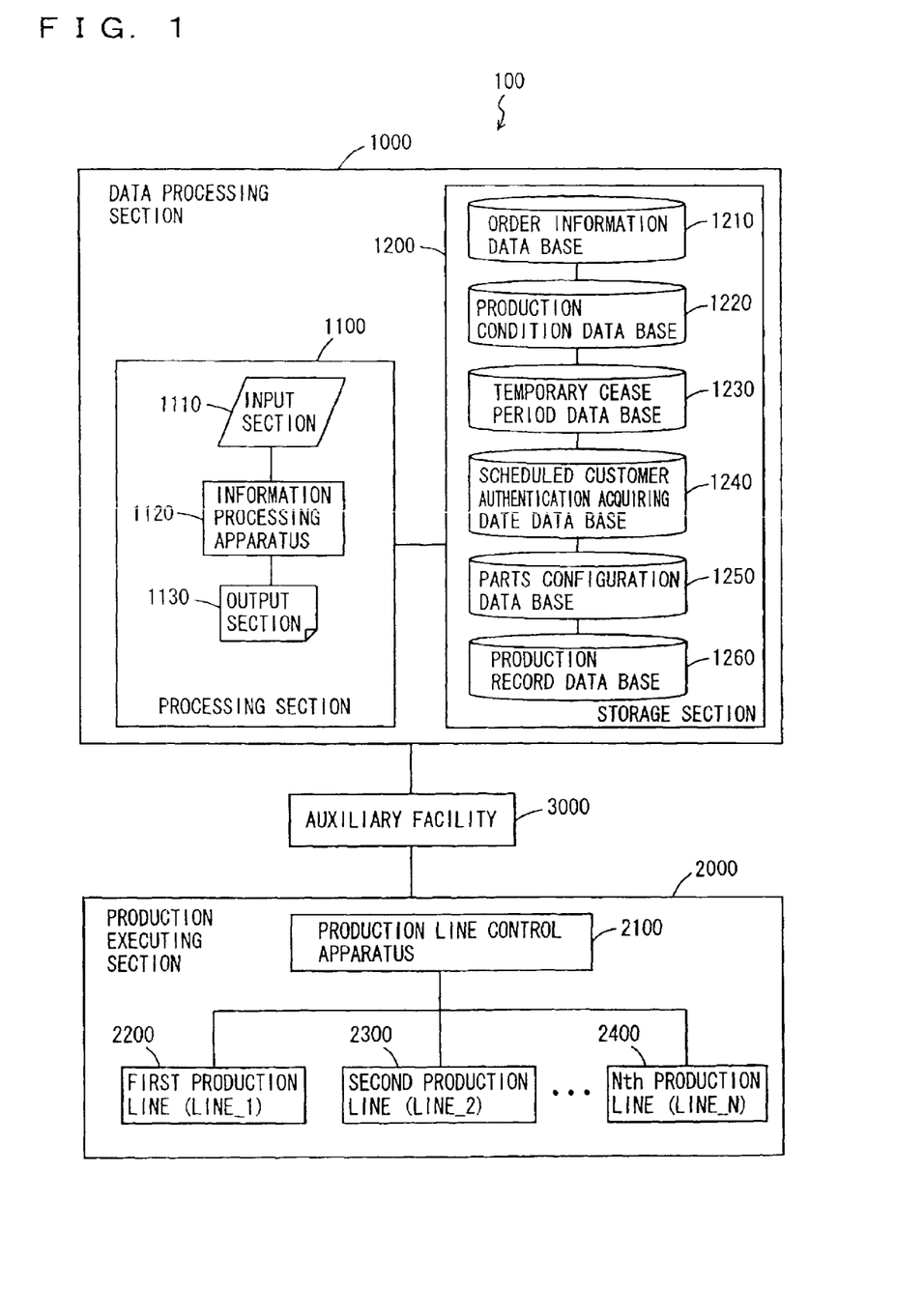
FIG. 1 is an overall configuration diagram of a production management system according to an embodiment of the present invention.

In FIG. 1, there is shown an overall configuration of a production management system according to this embodiment. As shown in FIG. 1, a production management system 100 is constructed of: a data processing section 1000, a production executing section 2000 controlling a plurality of production lines to execute production; and an auxiliary facility 3000, connecting the data processing section 1000 with the production executing section 2000, and including an interface for performing transmission and reception of data and others.

Data processing section 1000 includes: a processing section 1100 constituted of, for example, a computer, a work station or the like; and a storage section 1200 constituted of a hard disk, a memory or the like. Processing section 1000 includes: an input section 1110 having a keyboard, a mouse and the like therein with which an operator inputs various kinds of data; an information processing apparatus 1120 having a CPU (Central Processing Unit) executing processing according to a predetermined procedure; and an output section 1130 such as a monitor, a printer or the like outputting a production instruction result or the like. Information processing apparatus 1120 executes a program expressed by a flowchart described later; thereby enabling a function of the production management system to be exerted.

Storage section 1200 stores various kinds of data bases. As shown in FIG. 1, storage section 1200 is constituted of an order information data base 1210, a production condition data base 1220, a temporary cease period data base 1230, a scheduled customer authentication acquiring date data base 1240, a parts configuration data base 1250, and a production record data base 1260.

Production executing section 2000 includes: a production line control apparatus 2100 collectively controlling a plurality of production lines, and a first production line (LINE__1) 2200, a second production line (LINE__2) 2300, . . . , and an Nth production line (LINE__N) 2400, all the production lines being connected to the production line control apparatus 2100. Production line control apparatus 2100 controls first production line (LINE__1) 2200, second production line (LINE__2) 2300, . . . , and Nth production line (LINE__N) 2400. Production line control apparatus 2100 controls first production line (LINE__1) 2200, second production line (LINE__2) 2300, . . . , and Nth production line (LINE__N) 2400 on the basis of information transmitted from information processing apparatus 1120 of data processing section 1000 through auxiliary facility 3000 and transmits production records from first production line (LINE__1) 2200, second production line (LINE__2) 2300, . . . , and Nth production line (LINE__N) 2400 to information processing apparatus 1120 through auxiliary facility 3000. Information processing apparatus 1120 stores production record data into production record data base 1260 of storage section 1200.

Figure 2:
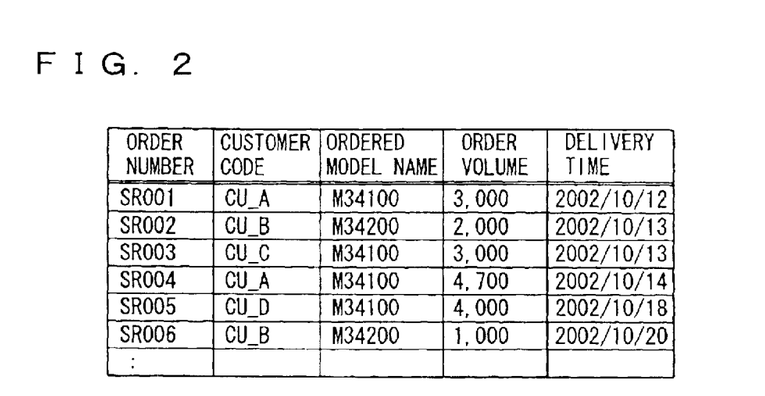
FIG. 2 is a table showing an example of data stored in an order information data base of FIG. 1.

In FIG. 2, there is shown an example of data stored in order information data base 1210 of FIG. 1. As shown in FIG. 2, stored in order information data base 1210 are an order number, a customer code, an ordered model name, an order volume and a delivery time.

Figure 3:
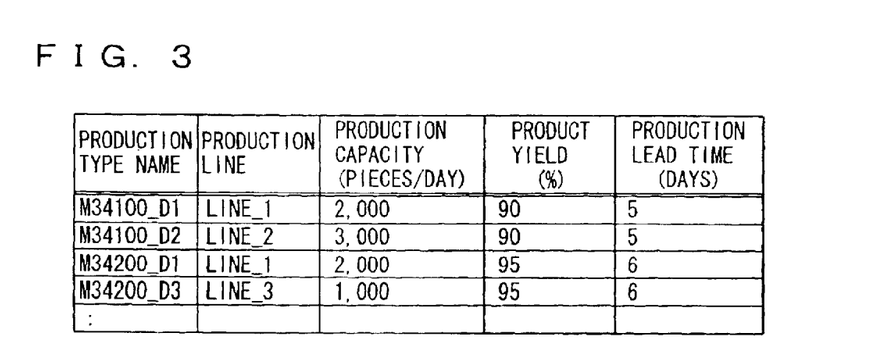
FIG. 3 is a table showing an example of data stored in a production condition data base of FIG. 1.

In FIG. 3, there is shown an example of data stored in production condition data base 1220 of FIG. 1. As shown in FIG. 3, stored in production condition data base 1220 are a production type name, a production line, a production capacity, a product yield, and a production lead time.

Figure 4:
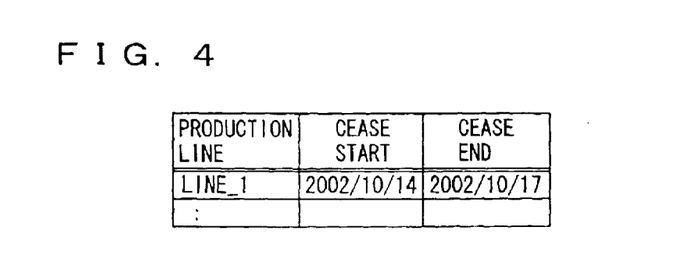
FIG. 4 is a table showing an example of data stored in a temporary cease period data base of FIG. 1.

In FIG. 4, there is shown an example of data stored in temporary cease period data base 1230 of FIG. 1. As shown in FIG. 4, stored in temporary cease period data base 1230 are a cease start of day, month and year, and a cease end of day, month and year for each production line.

Figure 5:
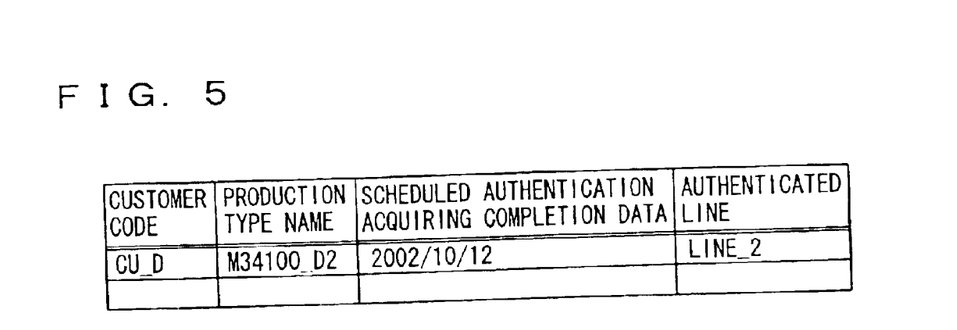
FIG. 5 is a table showing an example of data stored in a scheduled customer authentication acquiring date data base of FIG. 1.

In FIG. 5, there is shown an example of data stored in scheduled customer authentication acquiring date data base 1240 of FIG. 1. As shown in FIG. 5, stored in scheduled customer authentication acquiring date data base 1240 are a production type name, a scheduled authentication acquiring completion date and an authenticated line for each customer code.

As shown in FIG. 5, for example, stored in the data base are that a production type name "M34100_D2" is scheduled to receive authentication of second production line (LINE_2) 2300 on Oct. 12, 2002 from a customer with a customer code "CU_D". A lot produced in second production line (LINE_2) 2300 cannot be used on production type name "M34100_D2" for customer code "CU_D" till after the scheduled authentication acquiring completion date.

Figure 6:
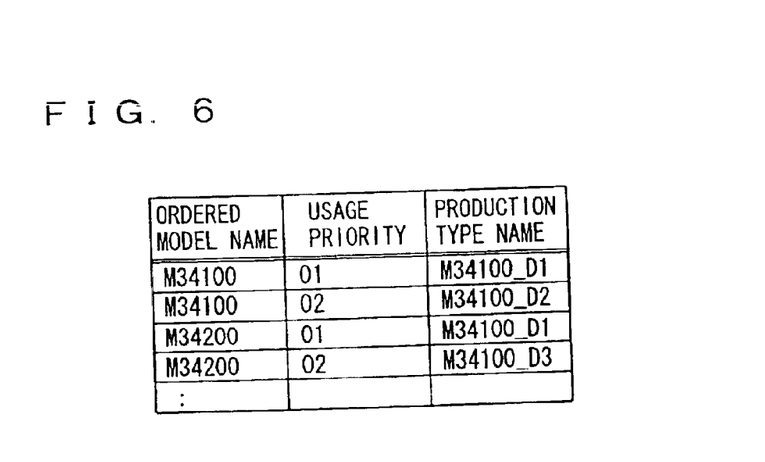
FIG. 6 is a table showing an example of data stored in a parts configuration data base of FIG. 1.

In FIG. 6, there is shown an example of data stored in parts configuration data base 1250 of FIG. 1. As shown in FIG. 6, stored in parts configuration data base 1250 are a usage priority, a production type name corresponding to a usage priority for each ordered model name.

Figure 7:
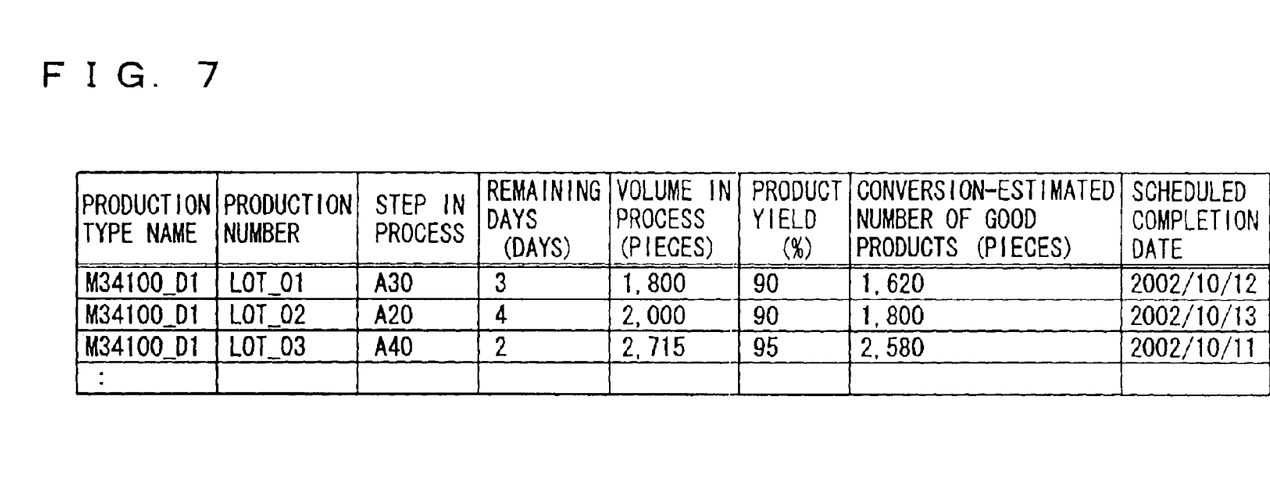
FIG. 7 is a table showing an example of data stored in a production record data base of FIG. 1.

In FIG. 7, there is shown an example of data stored in production record data base 1260 of FIG. 1. As shown in FIG. 7, stored in production record data base 1260 are a production type name, a production number (a lot number) corresponding to a production type name, a current step in process, remaining days till completion of production, a volume in process, a product yield, a conversion-estimated number of good products and a scheduled completion date. The conversion-estimated number of good products is obtained by multiplying a volume in process with a product yield.

Note that data stored in temporary cease period data base 1230 shown in FIG. 4 can also be replaced with a production calendar. Furthermore, the temporary cease period is, for example, that a production line temporarily ceases its operation for maintenance of constituent machines or the like reason among first production line (LINE_1) 2200, second production line (LINE_2) 2300 and Nth production line 2400.

Figure 8:
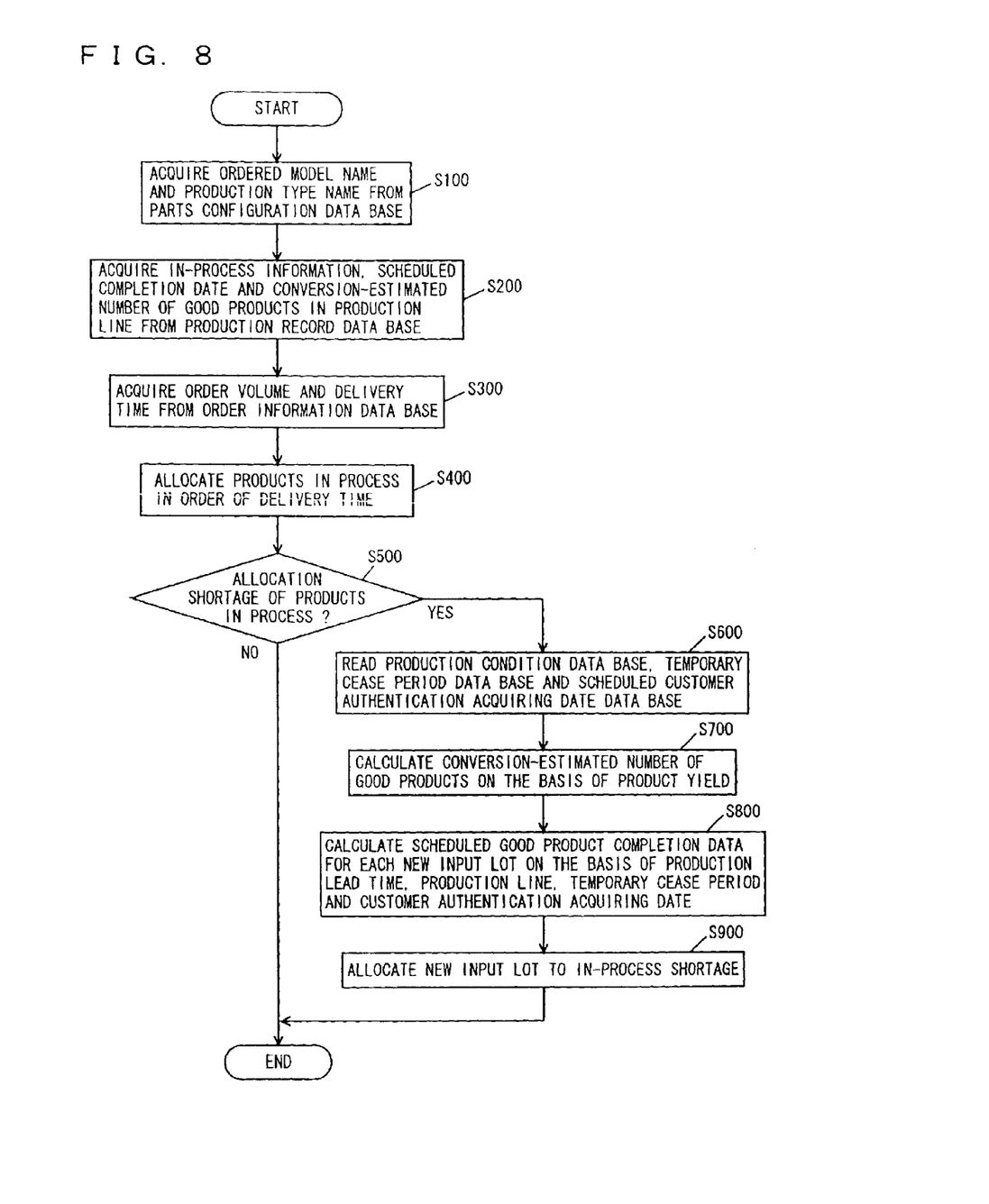
FIG. 8 is a flowchart showing a control structure of a program executed in an information processing apparatus of FIG. 1.

Referring to FIG. 8, description will be given of a control structure of a program executed in information processing apparatus 1120 of FIG. 1. Information processing apparatus 1120 includes a CPU, which reads a program stored in an internal memory of information processing apparatus 1120 or a fixed disk to execute the program.

In step (hereinafter, abbreviated simply to "S") 100, information processing apparatus 1120 acquires an ordered model name and a production type name from parts configuration data base 1250. In S200, information processing apparatus 1120 acquires in-process information in a production line, a scheduled completion date and a conversion-estimated number of good products from production record data base 1260.

In S300, information processing apparatus 1120 acquires an order volume and a delivery time from order information data base 1210. In S400, information processing apparatus 1120 allocates products in process in chronological order of delivery time.

In S500, as a result of the allocation by information processing apparatus 1120 in S400, it is determined whether or not products currently in process in a production line are insufficiently allocated to the order volume. When it is determined that shortage of allocation arises on the products currently in process (YES in S500), the process proceeds to S600. When not, (NO in S500), the process is terminated.

In S600, information processing apparatus 1120 reads production condition data base 1220, temporary cease period data base 1230 and scheduled customer authentication acquiring date data base 1240. In S700, information processing apparatus 1120 calculates a conversion-estimated number of good products based on a product yield. At this time, the conversion-estimated number of good products is, as described above, calculated by multiplying a volume in process with a product yield.

In S800, information processing apparatus 1120 calculates a scheduled good product completion date for each new input lot on the basis of a production lead time, production line, a temporary cease period and a customer authentication acquiring date. In S900, information processing apparatus 1120 allocates the new input lot to fill a shortage of volume in process therewith.

Figure 9A:
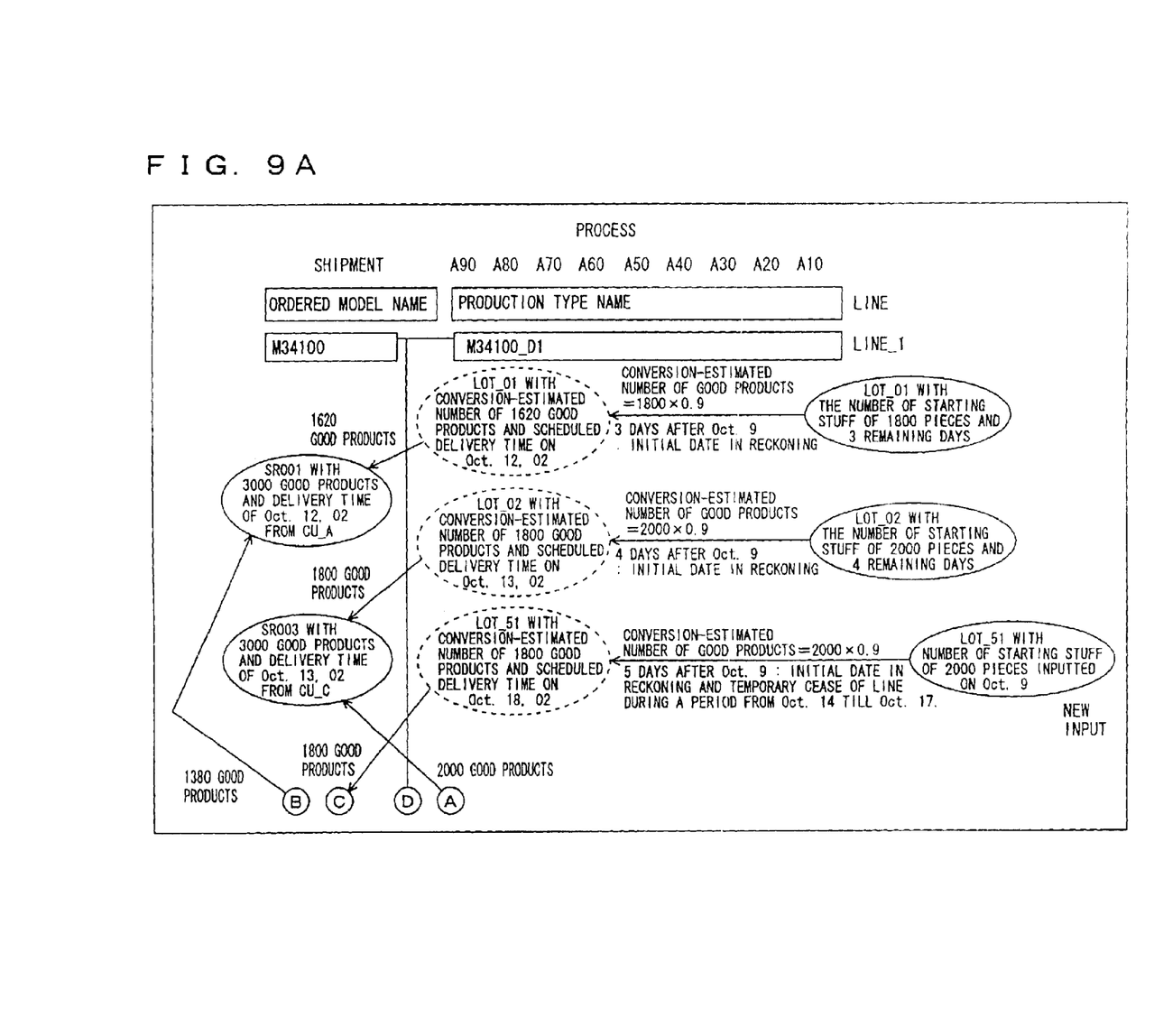
FIGS. 9A and 9B are representations for describing operations in a production management system according to an embodiment of the present invention.
Figure 9B:
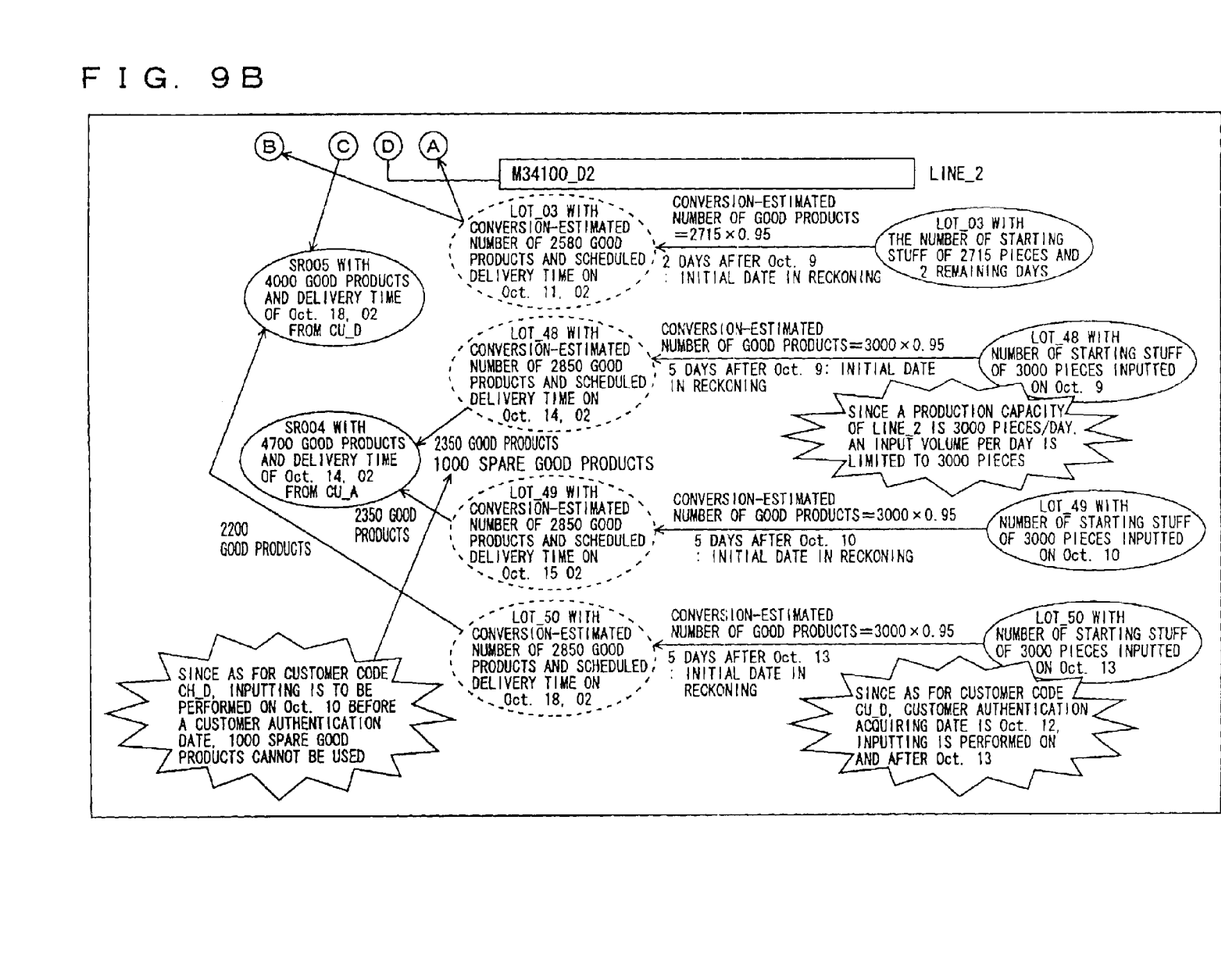

Description will be given of workings of a production management system according to this embodiment based on a structure and a flowchart as described above. In FIGS. 9A and 9B, there is shown a representation for describing operations in the production management system according to this embodiment. Note that the ordered model name shown in FIG. 2 is "M34100". Description will be given of order number "SR001", order number "SR003", order number "SR004" and order number "SR005".

An ordered model name and a production type name are acquired from parts configuration data base 1250 by information processing apparatus 1120 (S100) and in-process information, a scheduled completion date and a conversion-estimated number of good products are acquired from production record data base 1260 by information processing apparatus 1120 (S200). Along with the operations, an order volume and a delivery time are acquired from order information data base 1210 (S300) and products in process allocated in chronological order of delivery time (S400).

At this time, as shown in FIGS. 9A and 9B, as for an order number "SR001" with the earliest delivery time, allocation is performed with 1620 good products from 1800 pieces of starting stuff of LOT_01 currently in process in first production line (LINE_1) 2200 and 1380 good products, as part of 2580 good products from 2715 pieces of starting stuff of LOT_03 currently in process in second production line (LINE_2) 2300. With this procedure, as for order number "SR001" (with an order volume of 3000 products and a delivery date of Oct. 12, 2002), the order volume and delivery time are both satisfied with LOT_1 and part of LOT_03.

As for order number "SR003" with the second earliest delivery time, allocation is performed with 1800 good products from 2000 pieces of starting stuff of LOT_02 currently in process in first production line (LINE_1) 2200 and 1200 good products, as a residue after allocation to order number "SR001" of LOT_03 currently in process in second production line (LINE_2) 2300. With this procedure, as for order number "SR003" (with an order volume of 3000 products and a delivery date of Oct. 13, 2002), the order volume and delivery time are both satisfied with LOT_2 and the residue of LOT_03.

As for order number "SR004" and order number "SR005" with the third earliest delivery time, LOT_01, LOT_02 and LOT_03 currently in process have been already allocated; therefore, no new allocation cannot be performed from the lots. Hence, it is determined that there is shortage of a volume in process for a further allocation therewith (YES in S500) and information processing apparatus 1120 reads production condition data base 1220, temporary cease period data base 1230 and scheduled customer authentication acquiring date data base 1240 (S600) and calculates a conversion-estimated number of good products based on a product yield (S700). On this occasion, the conversion-estimated number of good products are calculated as in the following figures such as that for LOT_51, a conversion-estimated number of good products is 1800 on an input number of starting stuff of 2000; for LOT_48, a conversion-estimated number of good products is 2850 on an input number of starting stuff of 3000; for LOT_49, a conversion-estimated number of good products is 2850 on an input number of starting stuff of 3000; and for LOT_50, a conversion-estimated number of good products is 2850 on an input number of starting stuff of 3000. The input numbers correspond to respective production capacities of production condition data base (FIG. 3).

Scheduled good product completion dates are calculated for the respective new input lots (the new input lots used here are LOT_48, LOT_49, LOT_50 and LOT_51) each based on a production lead time, a production line, a temporary cease period and a customer authentication acquiring date. At this time, as shown in FIGS. 9A and 9B, as for LOT_48, 3000 pieces of the starting stuff, which amounts to a daily production capacity, is inputted to second production line (LINE_2) 2300 on October 9. As for LOT_49, 3000 pieces of the starting stuff is inputted to second production line (LINE_2) 2300 on October 10 of the following day. As a result, a scheduled completion date for LOT_48 is Oct. 14, 2002 and a scheduled completion date for LOT_49 is October 15.

As for order number "SR004", for example, allocation is performed with 4700 good products as the sum of 2350 good products, as part of 2850 good products of LOT_48 and 2350 good products, as part of 2850 good products of LOT_49. With this procedure, as for order number "SR004" (with order volume of 4700 products and delivery date of Oct. 14, 2002), the order volume and the delivery date are satisfied by part of LOT_48 and part of LOT_49.

In this situation, 1000 good products in total remains as spare good products in LOT_48 and LOT_49. On the other hand, as for order number "SR005" to which allocation is not completed, a user thereof is "CU_D". According to scheduled customer authentication acquiring date data base 1240 (FIG. 5), a date for a customer authentication by a customer with customer code "CU_D" on second production line (LINE_2) 2300 is scheduled to be Oct. 12, 2002. Therefore, no allocation to order number "SR005" is allowed with LOT_48 and LOT_49 inputted on October 9 and October 10, respectively, which are before the scheduled authentication acquiring date of October 12.

Therefore, since as for "SR005", authentication on first production line (LINE_1) 2200 has been already acquired from a customer with customer code "CU_D", 2000 pieces of starting stuff, which amounts to a production capacity of first production line (LINE_1) 2200, is inputted as LOT_51 on October 9. As for LOT_51, production of 1800 good products is completed on Oct. 18, 2002 in consideration of a period from the cease start till the cease end shown in temporary cease period data base 1230 (FIG. 4). The 1800 good products are allocated to order number "SR00538 .

As for second line (LINE_2) 2300, customer code "CU_D" is scheduled to authenticate second production line (LINE_2) 2300 on Oct. 12, 2002. Hence, 3000 pieces of starting stuff of LOT_50, which amounts to a production capacity of second production line (LINE_2) 2300, are inputted to second production line (LINE_2) 2300 on October 13 of the following day thereof. As for LOT_51, production of 2850 good products is completed on October 18 later than October 13, which is the initial date in reckoning, by 5 days, since no temporary cease period is set. Then, 2200 good products, as part of the 2850 good products are allocated to order number "SR005".

As a result, as for order number "SR005" (with an order volume of 4000 products and a delivery time of Oct. 18, 2002), the order volume and delivery time are both satisfied with LOT_51 and part of LOT_50.

According to a production management system of this embodiment, as described above, production management is performed using a plurality of production lines and there are stored not only a temporary cease period of each production line, but also scheduled customer authentication acquiring dates. Not only are production records from production lines collected, but order information from a customer and a production record are also compared with each other and good products obtained are allocated in chronological order of delivery date. When an order volume cannot be filled with a current volume in process of a plurality of production lines, a prescribed number of lots is inputted according to a capacity of each production line. At this time, in a case where customer authentication on a production line is not acquired, an input date is set on a date later than a scheduled customer authentication acquiring date. Furthermore, considering a temporary cease period, a scheduled completion date and a conversion-estimated number of good products are calculated and a shortage, if any, is allocated with good products obtained from a new input lot based on a conversion-estimated number and a scheduled completion date for the new input lot. As a result, in a case where production management is performed in a plurality of production lines, consideration is given to various restraint conditions from a customer associated with each line and cease conditions for production lines, thereby enabling management of production while realizing a just-in-time scheme.

Second Embodiment

Hereinafter, description will be given of a production management system according to a second embodiment of the present invention. Note that a production management of this embodiment is the same as the production management system according to the first embodiment described above in a hardware configuration and a data base configuration. Accordingly, none of detailed descriptions thereof will be repeated herein.

Since a parallel production plan is a model for production and supply on a mutual basis, there is performed neither production and supply with old model products nor supply of only new model products in new production lines due to a change in the lines at a later time since products in process in and stock from current production lines are allocated with the highest priority. Therefore, the following processing is implemented using the same configuration as the production management system according to the first embodiment described above.

Consideration is given to a case where a product model name "M34100_D1" is an old model product and a product model name "M34100_D2" is a new model product, which is of an updated version of the former product, wherein if "M34100_D1", which is an old model product, is not desired to use, a product yield in production condition data base 1220 is set to 0%. As for a new input lot, a conversion-estimated number of good products is calculated from the number of input pieces and a product yield thereof and a conversion-estimated number of good products of "M34100_D1" for a production type name is 0, which negates production and supply of this product. Therefore, only "M34100_D2", updated in version, is allocated.

According to the production management system according to this embodiment, when a product is of an updated version and therefore, products produced in another line is not desired to be allocated, a product yield of a production condition data base is altered; thereby enabling easy adaptation therefor.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A production management method for performing parallel production in a plurality of production lines, comprising the steps of:

storing order information concerning an order volume and a delivery time thereof from a purchaser;

storing cease period information concerning a cease period of a production line;

storing authentication information concerning authentication of a production line from the purchaser;

detecting a volume in process in said plurality of production lines;

calculating an additional input volume on the basis of said volume in process and said order volume;

calculating a scheduled production completion date in consideration of said cease period for an input lot for which said authentication information is obtained; and allocating said input lot to said order information on the basis of said scheduled production completion date and said delivery time.

2. The production management method according to claim 1, further comprising the steps of:

calculating the number of good products in consideration of a product yield for said input lot for which said authentication information is obtained; and allocating said input lot to said order information on the basis of a relation between said scheduled production completion date and said delivery time, and a relation between said order volume and said number of good products.

3. The production management method according to claim 2, wherein said step of allocating said input lot to said order information includes a step of allocating said input lot to said order information in chronological order of delivery time.

4. The production management method according to claim 3, further comprising the step of:

storing information concerning priorities of said plurality of production lines, wherein said step of allocating said input lot to said order information includes a step of allocating said input lot to said order information in consideration of said priorities.

5. The production management method according to claim 4, further comprising the step of:

setting a product yield in a production line, whose usage is not allowed, out of said plurality of production lines to 0%.

6. The production management method according to claim 3, further comprising the step of:

setting a product yield in a production line, whose usage is not allowed, out of said plurality of production lines to 0%.

7. The production management method according to claim 2, further comprising the step of:

storing information concerning priorities of said plurality of production lines, wherein said step of allocating said input lot to said order information includes a step of allocating said input lot to said order information in consideration of said priorities.

8. The production management method according to claim 7, further comprising the step of:

setting a product yield in a production line, whose usage is not allowed, out of said plurality of production lines to 0%.

9. The production management method according to claim 2, further comprising the step of:

setting a product yield in a production line, whose usage is not allowed, out of said plurality of production lines to 0%.

10. The production management method according to claim 1, wherein said step of allocating said input lot to said order information includes a step of allocating said input lot to said order information in chronological order of delivery time.

11. The production management method according to claim 10, further comprising the step of:

storing information concerning priorities of said plurality of production lines, wherein said step of allocating said input lot to said order information includes a step of allocating said input lot to said order information in consideration of said priorities.

12. The production management method according to claim 11, further comprising the step of:

setting a product yield in a production line, whose usage is not allowed, out of said plurality of production lines to 0%.

13. The production management method according to claim 10, further comprising the step of:

setting a product yield in a production line, whose usage is not allowed, out of said plurality of production lines to 0%.

14. The production management method according to claim 1, further comprising the step of:

storing information concerning priorities of said plurality of production lines, wherein said step of allocating said input lot to said order information includes a step of allocating said input lot to said order information in consideration of said priorities.

15. The production management method according to claim 14, further comprising the step of:

setting a product yield in a production line, whose usage is not allowed, out of said plurality of production lines to 0%.

16. The production management method according to claim 1, further comprising the step of:

setting a product yield in a production line, whose usage is not allowed, out of said plurality of production lines to 0%.

* * * * *